(12) United States Patent
Newberg et al.

(10) Patent No.: US 12,020,348 B2
(45) Date of Patent: Jun. 25, 2024

(54) DECENTRALIZED PROCEDURAL DIGITAL ASSET CREATION IN AUGMENTED REALITY APPLICATIONS

(71) Applicant: Lemon Inc., Grand Cayman (KY)

(72) Inventors: Nick Newberg, Los Angeles, CA (US); Peilin Li, Los Angeles, CA (US); Runjia Tian, Los Angeles, CA (US); Nathanael Schager, Los Angeles, CA (US); Gamze Inanc, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/737,569

(22) Filed: May 5, 2022

(65) Prior Publication Data

US 2023/0360280 A1 Nov. 9, 2023

(51) Int. Cl.
 *G06T 11/00* (2006.01)
(52) U.S. Cl.
 CPC .......... *G06T 11/00* (2013.01); *G06T 2200/24* (2013.01)
(58) Field of Classification Search
 None
 See application file for complete search history.

(56) References Cited

U.S. PATENT DOCUMENTS

| | | |
|---|---|---|
| 10,505,726 B1 | 12/2019 | Andon et al. |
| 2013/0162574 A1* | 6/2013 | Kobayashi ............ G06F 3/0488 345/173 |
| 2019/0163700 A1* | 5/2019 | Baumgardner ....... H04L 9/0637 |
| 2019/0340820 A1* | 11/2019 | Sivanadian ...... H04N 21/23106 |
| 2020/0097671 A1 | 3/2020 | Chou et al. |

(Continued)

FOREIGN PATENT DOCUMENTS

CN 114429389 A 5/2022

OTHER PUBLICATIONS

Duguleana et al., "Augmented Reality meets Non-Fungible Tokens: Insights Towards Preserving Property Rights," 2021 IEEE International Symposium on Mixed and Augmented Reality Adjunct (ISMAR-Adjunct), Oct. 8, 2021, 4 pages.

(Continued)

*Primary Examiner* — Kyle Zhai
(74) *Attorney, Agent, or Firm* — Astute IP Law Group

(57) ABSTRACT

Example implementations include a method, apparatus and computer-readable medium for decentralized procedural digital asset creation, comprising receiving a first request to create a digital asset from an application executing an augmented reality effect on a computing device, wherein the first request includes an identifier associated with a user of the application. The implementations further include generating the digital asset and metadata of the digital asset, wherein the metadata includes information about characteristics of the digital asset and ownership of the digital asset by the user. Additionally, the implementations further include storing the metadata on a blockchain. Additionally, the implementations further include receiving a second request to access the digital asset from the application. Additionally, the implementations further include transmitting, to the application for rendering, the metadata stored on the blockchain in response to validating the identifier associated with the user in the second request.

13 Claims, 6 Drawing Sheets

(56) References Cited

U.S. PATENT DOCUMENTS

2020/0394843 A1* 12/2020 Ramachandra Iyer ...................... G06F 16/434
2021/0264444 A1    8/2021 Chen et al.
2021/0377052 A1* 12/2021 Brown ...................... H04L 9/50
2022/0351280 A1* 11/2022 Cardenas Gasca .......................... G06Q 20/0655

OTHER PUBLICATIONS

International Search Report in PCT/SG2023/050295, dated Oct. 23, 2023, 5 pages.

* cited by examiner

DECENTRALIZED PROCEDURAL DIGITAL ASSET CREATION IN AUGMENTED REALITY APPLICATIONS

TECHNICAL FIELD

The described aspects relate to distributed ledger systems.

BACKGROUND

Aspects of the present disclosure relate generally to distributed ledger systems, and more particularly, to decentralized procedural digital asset creation in augmented reality applications.

Collaboration and social interaction propel the creative nature of the modern world. However, in terms of conventional tokens/assets that are non-interchangeable and are typically handmade by artists as 2D images, the creative process ceases once the asset is produced. This is because such assets largely remain static. Aside from the ownership transfer of an asset, there is not much that occurs once the asset has been created (e.g., no modifications). The creation of an asset is also not easily accessible to the general population unfamiliar with smart contracts and distributed ledgers. There is thus a need for a more accessible approach to creating assets, enabling the ability to modify the assets to promote creativity, and for providing efficient storage of the modified assets.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for decentralized procedural digital asset creation, comprising receiving a first request to create a digital asset from an application executing an augmented reality effect on a computing device, wherein the first request includes an identifier associated with a user of the application. The method further includes generating the digital asset and metadata of the digital asset, wherein the metadata includes information about characteristics of the digital asset and ownership of the digital asset by the user. Additionally, the method further includes storing the metadata on a blockchain. Additionally, the method further includes receiving a second request to access the digital asset from the application. Additionally, the method further includes transmitting, to the application for rendering, the metadata stored on the blockchain in response to validating the identifier associated with the user in the second request.

Another example aspect includes an apparatus for decentralized procedural digital asset creation, comprising a memory and a processor communicatively coupled with the memory. The processor is configured to receive a first request to create a digital asset from an application executing an augmented reality effect on a computing device, wherein the first request includes an identifier associated with a user of the application. The processor is further configured to generate the digital asset and metadata of the digital asset, wherein the metadata includes information about characteristics of the digital asset and ownership of the digital asset by the user. Additionally, the processor further configured to store the metadata on a blockchain. Additionally, the processor further configured to receive a second request to access the digital asset from the application. Additionally, the processor further configured to transmit, to the application for rendering, the metadata stored on the blockchain in response to validating the identifier associated with the user in the second request.

Another example aspect includes an apparatus for decentralized procedural digital asset creation, comprising means for receiving a first request to create a digital asset from an application executing an augmented reality effect on a computing device, wherein the first request includes an identifier associated with a user of the application. The apparatus further includes means for generating the digital asset and metadata of the digital asset, wherein the metadata includes information about characteristics of the digital asset and ownership of the digital asset by the user. Additionally, the apparatus further includes means for storing the metadata on a blockchain. Additionally, the apparatus further includes means for receiving a second request to access the digital asset from the application. Additionally, the apparatus further includes means for transmitting, to the application for rendering, the metadata stored on the blockchain in response to validating the identifier associated with the user in the second request.

Another example aspect includes a computer-readable medium having instructions stored thereon for decentralized procedural digital asset creation, wherein the instructions are executable by a processor to receive a first request to create a digital asset from an application executing an augmented reality effect on a computing device, wherein the first request includes an identifier associated with a user of the application. The instructions are further executable to generate the digital asset and metadata of the digital asset, wherein the metadata includes information about characteristics of the digital asset and ownership of the digital asset by the user. Additionally, the instructions are further executable to store the metadata on a blockchain. Additionally, the instructions are further executable to receive a second request to access the digital asset from the application. Additionally, the instructions are further executable to transmit, to the application for rendering, the metadata stored on the blockchain in response to validating the identifier associated with the user in the second request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure provides a novel approach for generating a potential infinite set of 2D or 3D digital assets, storing their metadata on a distributed ledger (e.g., a blockchain), and allowing the asset to be dynamically modified if the creator so chooses. The systems and methods of the present disclosure enable a user to mint a new procedurally generated digital asset in a virtual environment (e.g., a graphical user interface of an augmented reality (AR) application, a virtual reality application, or a 2D graphics creation application). As a user interacts and modifies the digital asset, the commands made by the user are sent to a smart contract, which is configured to both generate metadata encapsulating a storage-efficient representation of the modified digital asset and store the metadata on a blockchain. Storage efficiency is important because storing images or 3D models in a distributed ledger is expensive. The metadata-approach of the present disclosure reduces cost by only storing necessary parameters to generation algorithms.

Subsequently, a rendering client (e.g., an AR application) may retrieve the metadata from the blockchain and deserialize the metadata to render the digital asset. In some aspects, if the digital asset creator adds functionality to the digital asset, users can complete actions in the virtual environment that may update the state of the digital asset (such as changing an appearance, destroying, transferring, or generating new digital assets).

Figure 1:
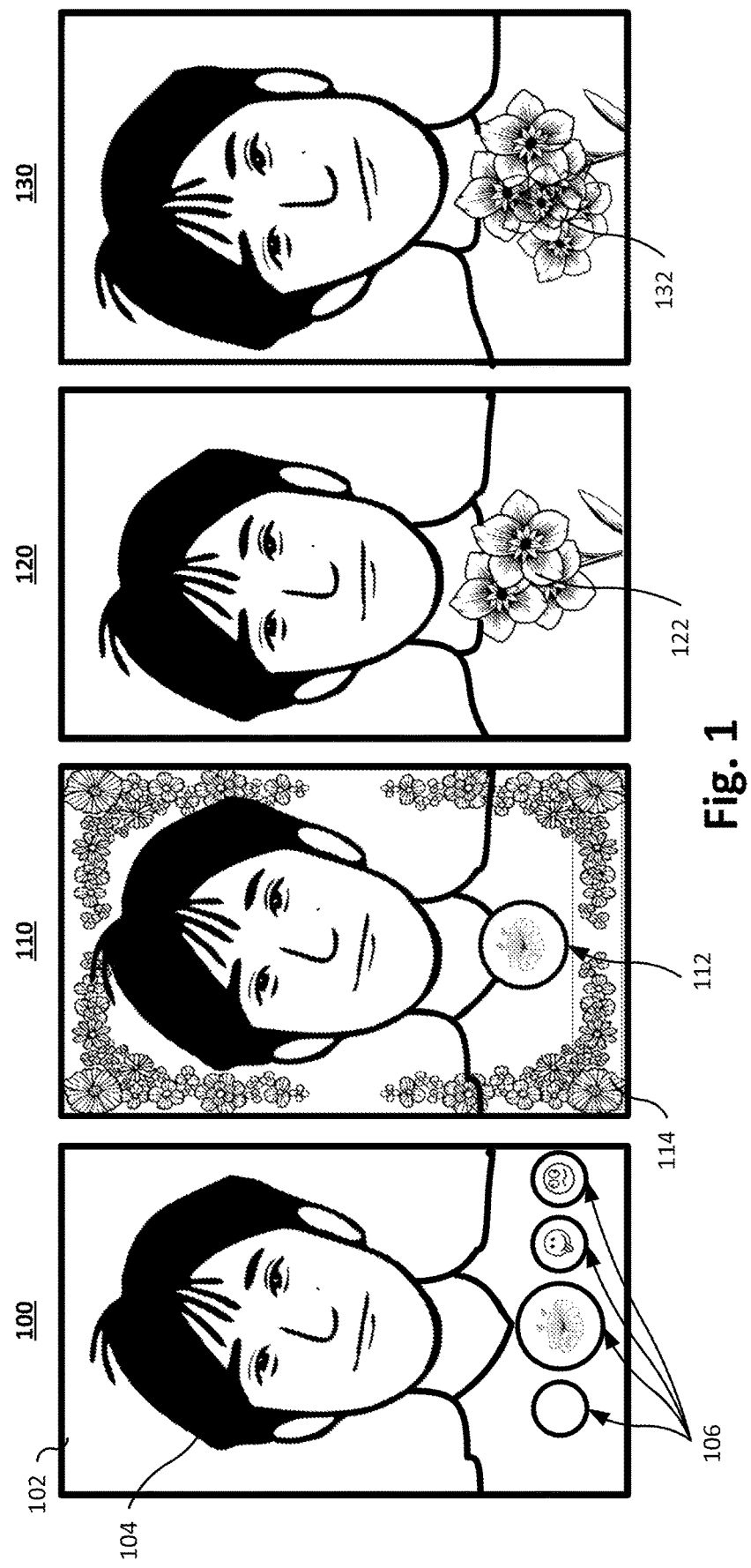
FIG. 1 is a diagram depicting multiple screens of an augmented reality application as a user interacts with a digital asset, in accordance with exemplary aspects of the present disclosure.

FIG. 1 is a diagram depicting multiple screens of an AR application as a user interacts with a digital asset on a computing device, in accordance with exemplary aspects of the present disclosure. Application 102 may be, but is not limited to, a social media application with AR features executing on the computing device. For example, application 102 may be a social media application in which users create and share visual content such as videos, photos, filters, etc. Screens 100, 110, and 120, and 130 may be screenshots of application 102 as user 104 interacts with application 102 over a period of time.

Screen 100 depicts an image of user 104 that is generated when the user activates a self-facing camera on his/her computing device (e.g., a smartphone). Interface buttons 106 may be selectable options that enable user 104 to access different types of visual content. For example, interface buttons 106 may be different AR modes. Suitable examples of different AR modes include, but are not limited to, graphics, emojis, icons, and various overlay 2D, 3D, and/or AR effects, among others. If the user selects a particular button associated with a particular AR mode, a corresponding AR mode effect is initialized. For example, in screen 110, user 104 has selected button 112, which activates AR effect 114. In this example of screen 110, AR effect 114 generates an overlay of flowers that border screen 110. It should be noted that although the example of flowers is provided in the present disclosure, AR effect 114 may involve or depict any object (e.g., animals, people, cartoons, vehicles, etc.) and likewise the digital assets produced from AR effect 114 may be any object as well.

Subsequently, user 104 may then interact with the floral overlay. For example, user 104 may click on the floral overlay and that may produce an animation of a new flower sprouting while the border fades away. It should be noted that user 104 may interact with AR effect 114 in any manner based on the functionality of AR effect 114. For example, AR effect 114 may prompt user 104 to select a single flower from the plurality of flowers shown in the floral overlay, causing the selected flower to be generated on screen 120. In another example, AR effect 114 may prompt user 104 to pull all of the flowers in the floral overlay to the center of screen 110, which causes the generation of a new flower shown on screen 120.

In screen 120, user 104 has generated digital asset 122 (i.e., the new flower). In the present disclosure, a digital asset is defined as a visual object generated by interacting with an AR effect. In some aspects, a digital asset is a token that is non-interchangeable. In FIG. 1, digital asset 122 is a flower that can be customized in accordance with the functionality programmed into the flower by a digital asset creator (e.g., the developer of AR effect 114). For example, a user may be able to change the size, color, transparency, and physical features of the flower in screen 120 (i.e., digital asset 122). In this case, for instance, such changes can include adding more flowers, removing petals, enlarging the petals, reducing the size of the core, adding leaves, etc. The customization capabilities are unlimited as the digital asset creator may even program digital asset 122 to change in accordance with user usage of application 102 (e.g., how often the user accesses features of application 102 dictates the size/color of the flower). In screen 130, for example, user 104 has adjusted digital asset 122 by adding additional flowers. This modification may occur by tapping on the flower to add new flowers or by following prompts on the AR application that indicate how to add flowers. Consequently, in this case, digital asset 132 is the modified version of digital asset 122.

Figure 2:
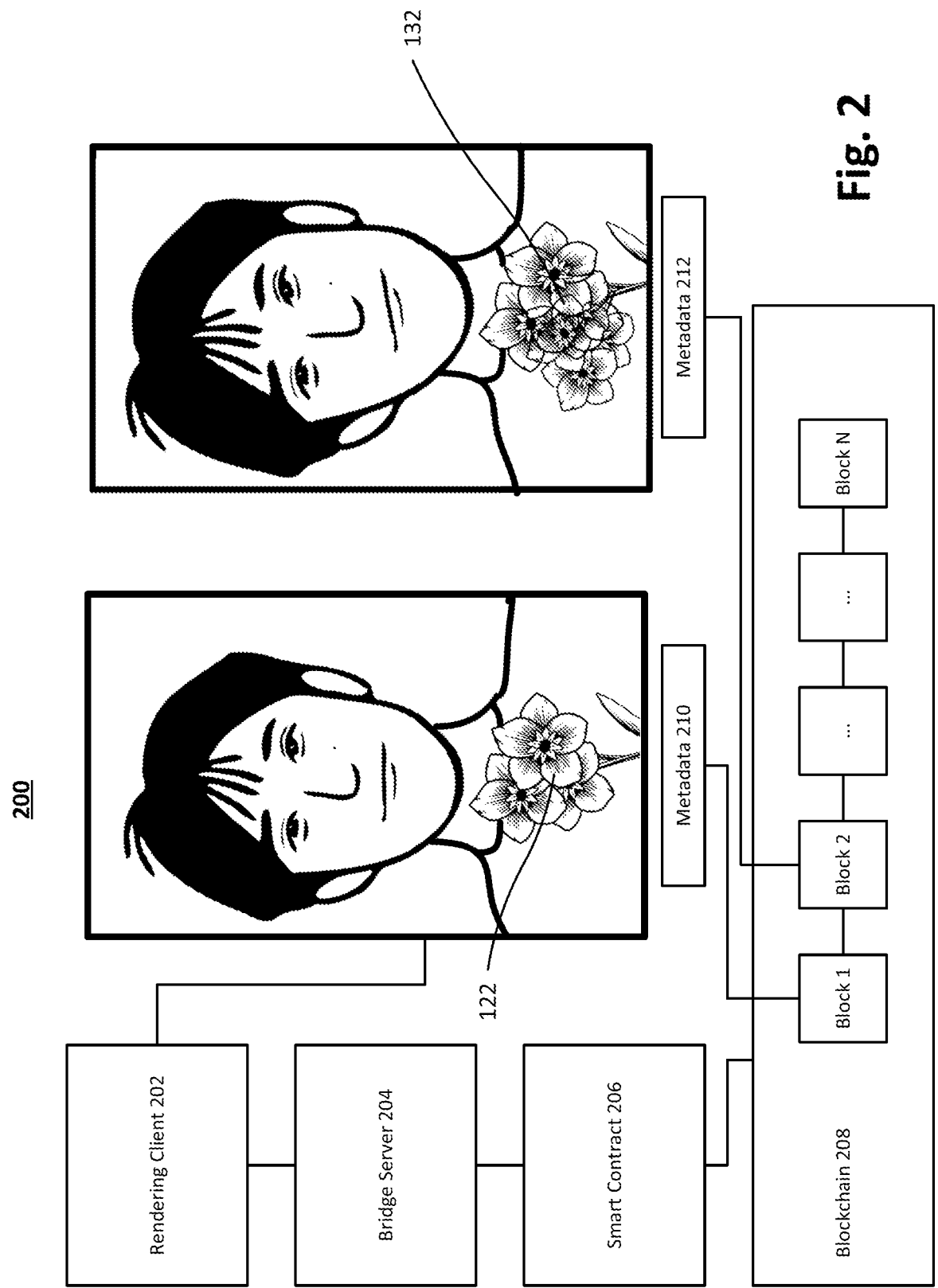
FIG. 2 is a diagram depicting a system for decentralized procedural digital asset creation, in accordance with exemplary aspects of the present disclosure.

FIG. 2 is a diagram depicting system 200 for decentralized procedural digital asset creation, in accordance with exemplary aspects of the present disclosure. System 200 includes rendering client 202, which may be any application, such as application 102, and/or any device capable of presenting content on a user interface. Rendering client 202 enables a user to mint and/or update digital assets by providing a user interface with options to mint and/or update digital assets. For example, a user may interact with AR effect 114 to produce digital asset 112. The requests/commands involved in the interaction are transmitted by rendering client 202 to bridge server 204, which routes requests/commands from client 202 to smart contract 206. Bridge server 204 may be a computing device with memory, a processor, and communication interfaces. In particular, because digital asset 122 is generated by the user interactions with AR effect 114, the corresponding requests/commands are considered requests for minting a digital asset.

Smart contract 206 may be a software program stored on blockchain 208 that runs when certain predetermined conditions are met. Such conditions include receiving a request to generate a digital asset, modify a digital asset, change ownership of a digital asset, delete a digital asset, etc. Smart contract 206 is specifically configured to generate digital asset metadata based on the requests/commands made by the user, and store the metadata on blockchain 208.

For example, user 104 may interact with AR effect 114 and request the generation of digital asset 122. Rendering client 202 may transmit the request to bridge server 204, which identifies smart contract 206 associated with AR effect 114. Bridge server 204 may further provide a unique identifier associated with user 104 (e.g., an address of the computing device where application 102 is installed). Smart contract 206 may verify whether the request is from the user (e.g., by validating the unique identifier) and in response to determining that the request is from the user, smart contract 206 may execute the request to mint digital asset 122. Smart contract 206 may further generate metadata 210, which is a representation of digital asset 122, and store metadata 210 in block 1 of blockchain 208.

In some aspects, metadata 210 may be any representation of digital asset 122 that can be used to recreate digital asset 122 on rendering client 202. Metadata 210 may include information about digital asset 122 (e.g., the amount of petals, the size, the colors, etc.) in a data structure (e.g., a vector) or a mathematical formula (e.g., a polynomial representation). Because storing the digital asset itself on blockchain 208 is inefficient in terms of storage usage, storing metadata allows for the digital asset to be recreated on rendering client 202 upon request without taking as much storage space.

After digital asset 122 has been generated, a user may modify the digital asset 122. The requests to modify the digital asset 122 are again carried to smart contract 206 via bridge server 204. In response to verifying that the modifications are authorized based on the unique identifier of user 104, smart contract 206 may generate digital asset 132 and metadata 212, which details the modifications made to digital asset 122 to create digital asset 132. For example, metadata 212 may indicate the updated number of flower petals. Smart contract 206 stores metadata 212 in block 2 of blockchain 208.

In other words, as the user changes the digital asset 122 or 132, smart contract 208 populates blockchain 208. For example, blockchain 208 may extend until block N, wherein N is a whole number, and where each block includes information about a modification made by the user.

Figure 3:
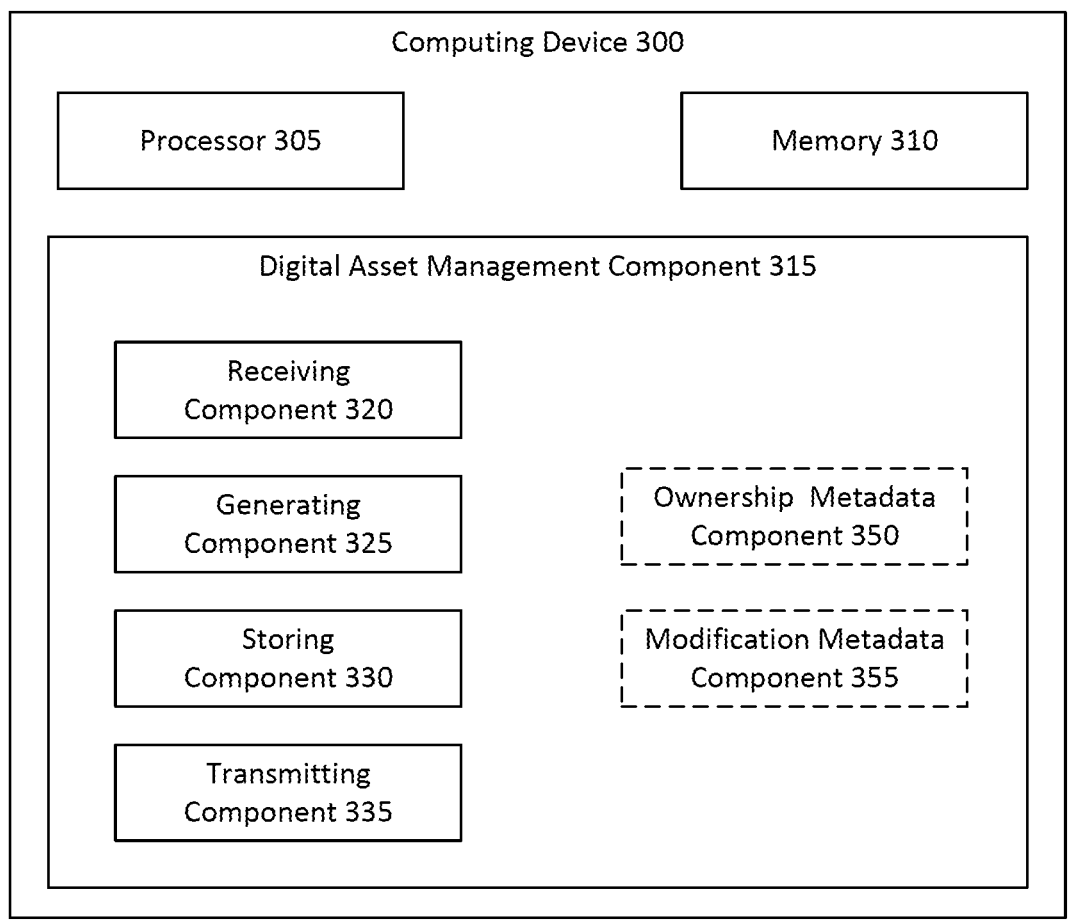
FIG. 3 is a block diagram of a computing device executing a digital asset management component, in accordance with exemplary aspects of the present disclosure.
Figure 4:
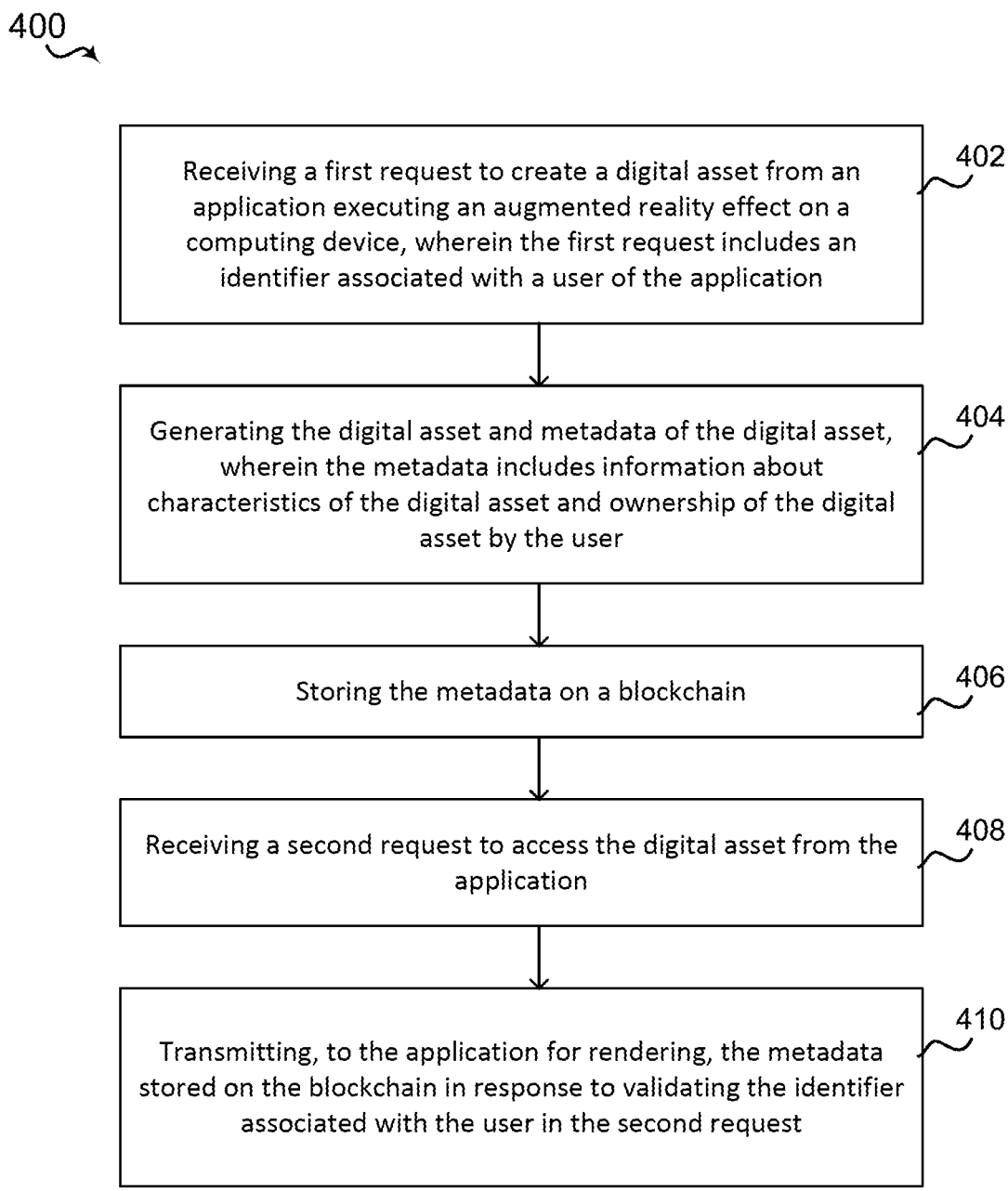
FIG. 4 is a flowchart illustrating a method of generating a digital asset and storing metadata of the digital asset on a blockchain, in accordance with exemplary aspects of the present disclosure.

Referring to FIG. 3 and FIG. 4, in operation, computing device 300 may perform a method 400 of decentralized procedural digital asset creation, such as via execution of digital asset management component 315 by processor 305 and/or memory 310.

At block 402, the method 400 includes receiving a first request to create a digital asset from an application executing an augmented reality effect on a computing device, wherein the first request includes an identifier associated with a user of the application. For example, in an aspect, computing device 300, processor 305, memory 310, digital asset management component 315, and/or receiving component 320 may be configured to or may comprise means for receiving a first request to create digital asset 122 from application 102 executing AR effect 114 on a computing device, wherein the first request includes an identifier associated with user 104 of application 102.

In some aspects, the first request includes at least one user identifier unique to user 104 and a list of actions comprising commands/requests from the interaction between user 104 and AR effect 114 on rendering client 202. In some aspects, a user identifier is a combination of characters that are unique to user 104. For example, the user identifier may be a wallet address to a wallet in which assets owned by the user are stored. The wallet is a software program or a physical device that enables storage of digital assets such as digital asset 122. The wallet may further include private and public encryption keys, wherein the public key is derived from the private key and may be the wallet address used to exchange digital assets. For example, the wallet address may be a combination of alphanumeric characters unique to user 104.

The receiving at block 402 may involve smart contract 206 receiving, via bridge server 204, the list of actions and the wallet address of user. For example, user 104 may select a flower on the floral overlay of AR effect 114 and the action of selecting is recorded by rendering client 202 and transmitted to bridge server 204 in the list of actions. Bridge server 204 may forward the list of actions to smart contract 206.

Receiving component 320 may be a function or module of smart contract 206 that determines when to trigger the functionality of smart contract 206. For example, receiving component 320 may determine that the list of actions includes a request/command to generate the digital asset and thus receiving component 320 advances method 400 to 402.

At block 404, the method 400 includes generating the digital asset and metadata of the digital asset, wherein the metadata includes information about characteristics of the digital asset and ownership of the digital asset by the user. For example, in an aspect, computing device 300, processor 305, memory 310, digital asset management component 315, and/or generating component 325 may be configured to or may comprise means for generating digital asset 122 and metadata 210 of digital asset 122, wherein metadata 210 includes information about characteristics of the digital asset and ownership of digital asset 210 by the user. In some aspects, metadata 210 is generated from trustless code in smart contract 206 that includes all the information needed for the client to render digital asset 122.

In some aspects, generating component 325 may also be a function or module of smart contract 206. Generating component 325 may generate metadata 210, which may be a data structure that includes the following information about digital asset 112: date of creation, user identifier(s) of a creator and/or owner of digital asset 112 (e.g., a wallet address of user 104, an IP/MAC address of the computing device on which rendering client 202 is installed, a name, a location, an email address, a username, a password, a phone number, etc.), and visual details of digital asset 122 (e.g., number of petals, size of petals, size of stem, size of leaves, number of leaves, colors of leaves, animation motion such as swaying, position, etc.).

At block 406, the method 400 includes storing the metadata on a blockchain. For example, in an aspect, computing device 300, processor 305, memory 310, digital asset management component 315, and/or storing component 330 may be configured to or may comprise means for storing metadata 210 on blockchain 208.

In some aspects, storing component 330 is a function or module of smart contract 206. In one example, storing component 330 may store metadata 210 in block 1 of blockchain 208. Block 1 may be a genesis block indicating the creation of digital asset 122.

At block 408, the method 400 includes receiving a second request to access the digital asset from the application. For example, in an aspect, computing device 300, processor 305, memory 310, digital asset management component 315, and/or receiving component 320 may be configured to or may comprise means for receiving a second request to access digital asset 122 from application 102.

Suppose that after generating digital asset 122, user 104 closes application 102 on his/her computing device. At a later time, user 104 may request to access digital asset 122. The interaction user 104 may have with AR effect 114 to access an already existing digital asset 122 may differ from the interaction user 104 may have to generate a new digital asset. For example, there may be a button of AR effect 114 that enables users to render pre-existing digital assets. When user 104 selects the button, the second request may be sent from rendering client 202 to bridge server 204. Bridge server 204 may route the second request to smart contract 206. In general, each decentralized digital asset has its own smart contract with a unique address on the blockchain. Bridge server 204 is configured to point to that unique address and send messages back and forth accordingly. Receiving component 320 of smart contract 206 receives this second request.

At block 410, the method 400 includes transmitting, to the application for rendering, the metadata stored on the blockchain in response to validating the identifier associated with the user in the second request. For example, in an aspect, computing device 300, processor 305, memory 310, digital asset management component 315, and/or transmitting component 335 may be configured to or may comprise means for transmitting, to application 102 for rendering, metadata 210 stored on blockchain 208 in response to validating the identifier associated with user 104 in the second request.

Each request received by smart contract 206 includes at least one user identifier (e.g., a wallet address). Because each user identifier is unique, smart contract 206 verifies whether the requests to access, generate, modify, transfer, delete, etc., originate from an authorized user. In some aspects, the authorized user may be a creator of the digital asset. In some aspects, the authorized user may be an owner of the digital asset (if the ownership has changed since the creation of the digital asset).

In response to determining that the user identifier in the second request matches a user identifier on blockchain 208 (e.g., the wallet address in the second request matches the wallet address in metadata 210 stored in block 1 of blockchain 208), smart contract 206 may transmit metadata 210 to rendering client 202. Rendering client 202 subsequently uses metadata 210 to render digital asset 122. For example, metadata 210 may include visual details that enable rendering client 202 to replicate the visual look of digital asset 122.

Figure 5:
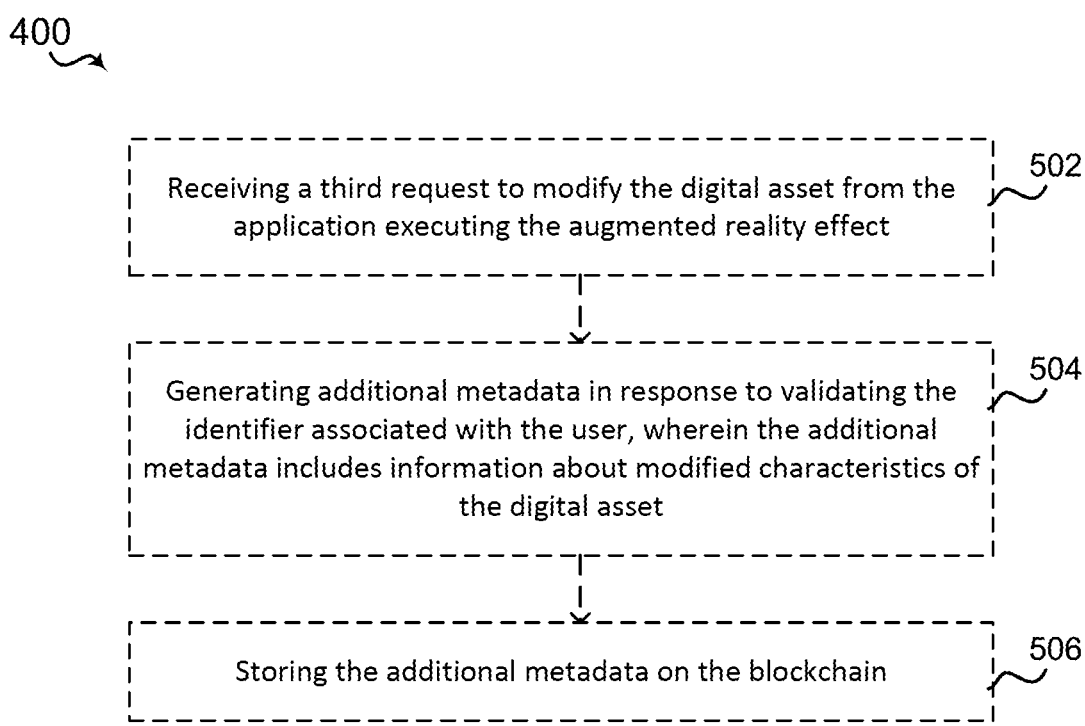
FIG. 5 is a flowchart illustrating a method of modifying a digital asset and storing metadata of the modified digital asset on a blockchain, in accordance with exemplary aspects of the present disclosure.

Referring to FIG. 5, in an optional aspect, at block 502, the method 400 may further include receiving a third request to modify the digital asset from the application executing the augmented reality effect. For example, in an aspect, computing device 300, processor 305, memory 310, digital asset management component 315, and/or receiving component 320 may be configured to or may comprise means for receiving a third request to modify digital asset 122 from application 102 executing AR effect 114.

For example, the third request may include the user identifier of user 104 and the list of actions taken to modify digital asset 122. Suppose that user 104 interacts with AR effect 114 and activates a feature of AR effect 114 that adds additional flowers to digital asset 122. The commands/actions involved in the interaction are included in the list of actions. For example, the modifications may produce digital asset 132.

In this optional aspect, at block 504, the method 400 may further include generating additional metadata in response to validating the identifier associated with the user, wherein the additional metadata includes information about modified characteristics of the digital asset. For example, in an aspect, computing device 300, processor 305, memory 310, digital asset management component 315, and/or generating component 325 may be configured to or may comprise means for generating metadata 212 in response to validating the identifier associated with user 104, wherein metadata 212 includes information about modified characteristics of digital asset 132.

Generating component 325 may validate that the user identifier in the third request matches the user identifier of the owner/creator according the latest block in blockchain 208. In response to validating the user identifier, generating component 325 may generate metadata 212. For example, metadata 212 may indicate that the number of flower petals were changed from 10 to 16.

In this optional aspect, at block 506, the method 400 may further include storing the additional metadata on the blockchain. For example, in an aspect, computing device 300, processor 305, memory 310, digital asset management component 315, and/or storing component 330 may be configured to or may comprise means for storing metadata 212 on blockchain 208 (e.g., in block 2).

In an alternative or additional aspect, the metadata is stored on a first block of the blockchain and the additional metadata is stored on a second block of the blockchain.

Figure 6:
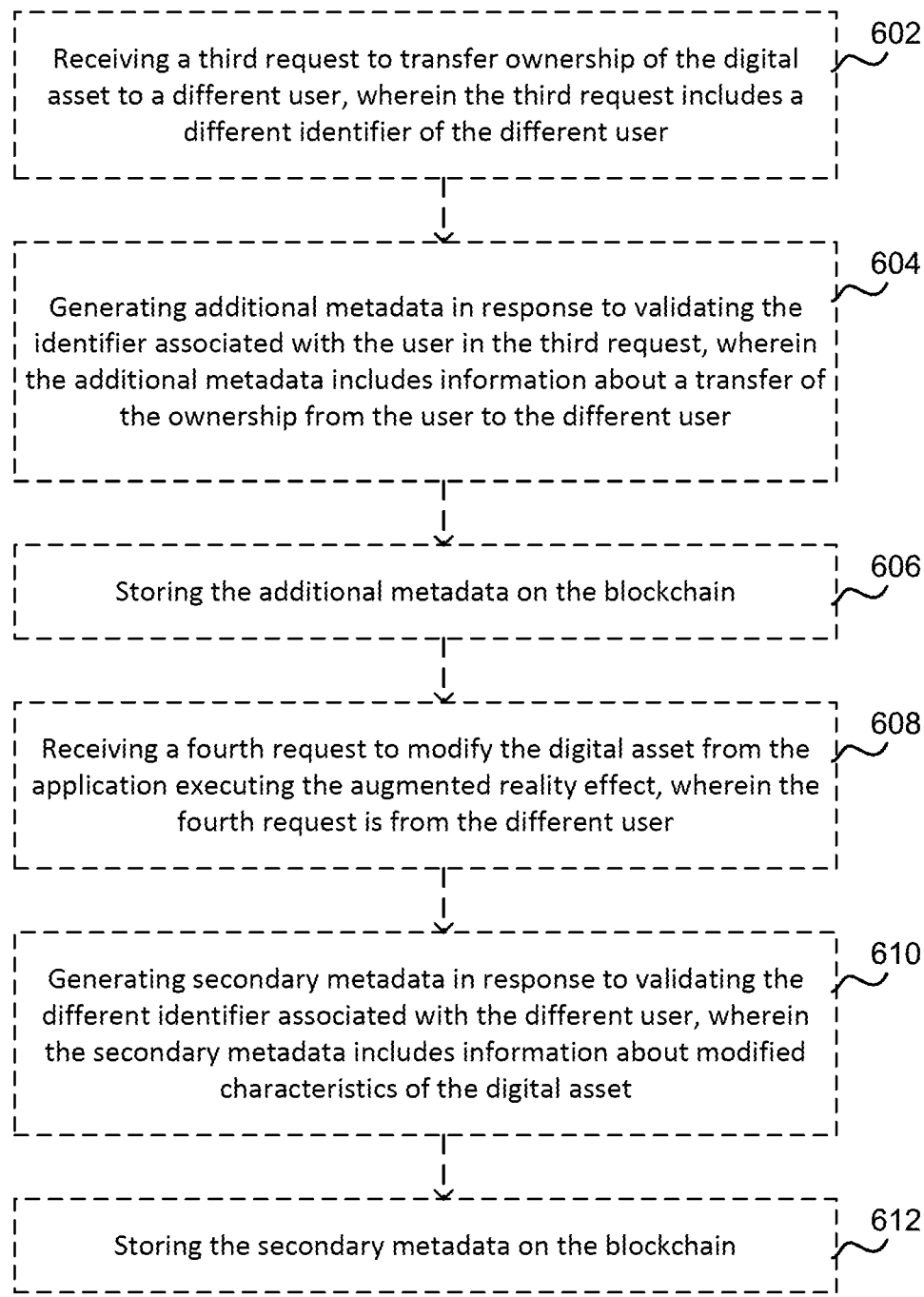
FIG. 6 is a flowchart illustrating a method of transferring ownership of a digital asset and storing ownership metadata of the digital asset on a blockchain, in accordance with exemplary aspects of the present disclosure.

Referring to FIG. 6, in an optional aspect, at block 602, the method 400 may further include receiving a third request to transfer ownership of the digital asset to a different user, wherein the third request includes a different identifier of the different user. For example, in an aspect, computing device 300, processor 305, memory 310, digital asset management component 315, and/or receiving component 320 may be configured to or may comprise means for receiving a third request to transfer ownership of digital asset 122 to a different user, wherein the third request includes a different identifier of the different user.

For example, the different identifier may be a wallet address of the wallet belonging to the different user.

In this optional aspect, at block 604, the method 400 may further include generating additional metadata in response to validating the identifier associated with the user in the third request, wherein the additional metadata includes information about a transfer of the ownership from the user to the different user. For example, in an aspect, computing device 300, processor 305, memory 310, digital asset management component 315, and/or ownership metadata component 350 may be configured to or may comprise means for generating additional metadata in response to validating the identifier associated with user 104 in the third request, wherein the additional metadata includes information about a transfer of the ownership from the user to the different user.

For example, ownership metadata component 350 may be a function or a module of smart contract 206. Ownership metadata component 350 may determine that the user identifier of user 104 in the third request matches the user identifier stored in metadata 210 in block 1 of blockchain 208. In response to validating the user identifier (i.e., confirming that user 104 is authorized to transfer ownership because user 104 is the current owner), ownership metadata component 350 may generate the additional metadata. The additional metadata may indicate that the previous owner is user 104, the new owner is the different user, a transfer date/time, and any other transaction details such as cost/fees involved.

In this optional aspect, at block 606, the method 400 may further include storing the additional metadata on the blockchain. For example, in an aspect, computing device 300, processor 305, memory 310, digital asset management component 315, and/or storing component 330 may be configured to or may comprise means for storing the additional metadata on blockchain 208 (e.g., block 2).

In this optional aspect, at block 608, the method 400 may further include receiving a fourth request to modify the digital asset from the application executing the augmented reality effect, wherein the fourth request is from the different user. For example, in an aspect, computing device 300, processor 305, memory 310, digital asset management component 315, and/or receiving component 320 may be configured to or may comprise means for receiving a fourth request to modify digital asset 122 from application 102 executing AR effect 114, wherein the fourth request is from the different user.

For example, the different user may interact with the digital asset on his/her application and the interactions are sent as a list of actions to bridge server 204. In this case, the fourth request includes the user identifier of the different user and the list of actions.

In this optional aspect, at block 610, the method 400 may further include generating secondary metadata in response to validating the different identifier associated with the different user, wherein the secondary metadata includes information about modified characteristics of the digital asset. For example, in an aspect, computing device 300, processor 305, memory 310, digital asset management component 315, and/or modification metadata component 355 may be configured to or may comprise means for generating secondary metadata in response to validating the different identifier associated with the different user, wherein the secondary metadata includes information about modified characteristics of the digital asset.

For example, modification metadata component 355 may validate that the user identifier in the fourth request matches the user identifier of the new owner according to blockchain 208 (i.e., block 2). In response to validating the user identifier, smart contract 206 enables the modification and generates the secondary metadata.

In this optional aspect, at block 612, the method 400 may further include storing the secondary metadata on the blockchain. For example, in an aspect, computing device 300, processor 305, memory 310, digital asset management component 315, and/or storing component 330 may be configured to or may comprise means for storing the secondary metadata on blockchain 208 (e.g., in block N).

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for decentralized procedural digital asset creation, comprising:
  receiving a first request to create a digital asset from an application executing an augmented reality effect on a computing device, wherein the first request includes an identifier associated with a user of the application and a plurality of actions executed in an interaction with the augmented reality effect that produces a visual object of the digital asset, wherein the digital asset is programmed to change one or both of a size and a color of the visual object based on a frequency of access of the application by the user;
  generating the digital asset and metadata of the digital asset based on the plurality of actions, wherein the metadata includes information about characteristics of the visual object of the digital asset and ownership of the digital asset by the user;
  storing the metadata without the digital asset on a blockchain;
  receiving a second request to access the digital asset from the application; and
  transmitting, to the application for rendering, the metadata stored on the blockchain in response to validating the identifier associated with the user in the second request.

2. The method of claim 1, wherein a smart contract is configured to generate the digital asset and the metadata, and store the metadata on the blockchain.

3. The method of claim 1, further comprising:
  receiving a third request to modify the digital asset from the application executing the augmented reality effect;
  generating additional metadata in response to validating the identifier associated with the user, wherein the additional metadata includes information about modified characteristics of the digital asset; and
  storing the additional metadata on the blockchain.

4. The method of claim 3, wherein the metadata is stored on a first block of the blockchain and the additional metadata is stored on a second block of the blockchain.

5. The method of claim 1, further comprising:
  receiving a third request to transfer ownership of the digital asset to a different user, wherein the third request includes a different identifier of the different user;
  generating additional metadata in response to validating the identifier associated with the user in the third request, wherein the additional metadata includes information about a transfer of the ownership from the user to the different user; and
  storing the additional metadata on the blockchain.

6. The method of claim 5, further comprising:
  receiving a fourth request to modify the digital asset from the application executing the augmented reality effect, wherein the fourth request is from the different user;
  generating secondary metadata in response to validating the different identifier associated with the different user, wherein the secondary metadata includes information about modified characteristics of the digital asset; and
  storing the secondary metadata on the blockchain.

7. An apparatus for decentralized procedural digital asset creation, comprising:
  a memory; and
  a processor communicatively coupled with the memory and configured to:
    receive a first request to create a digital asset from an application executing an augmented reality effect on a computing device, wherein the first request includes an identifier associated with a user of the application and a plurality of actions executed in an interaction with the augmented reality effect that produces a visual object of the digital asset, wherein the digital asset is programmed to change one or both of a size and a color of the visual object based on a frequency of access or the application by the user;

generate the digital asset and metadata of the digital asset based on the plurality of actions, wherein the metadata includes information about characteristics of the visual object of the digital asset and ownership of the digital asset by the user;

store the metadata without the digital asset on a blockchain;

receive a second request to access the digital asset from the application; and transmit, to the application for rendering, the metadata stored on the blockchain in response to validating the identifier associated with the user in the second request.

8. The apparatus of claim 7, wherein a smart contract is configured to generate the digital asset and the metadata, and store the metadata on the blockchain.

9. The apparatus of claim 7, wherein the processor is further configured to:

receive a third request to modify the digital asset from the application executing the augmented reality effect;

generate additional metadata in response to validating the identifier associated with the user, wherein the additional metadata includes information about modified characteristics of the digital asset; and store the additional metadata on the blockchain.

10. The apparatus of claim 9, wherein the metadata is stored on a first block of the blockchain and the additional metadata is stored on a second block of the blockchain.

11. The apparatus of claim 7, wherein the processor is further configured to:

receive a third request to transfer ownership of the digital asset to a different user, wherein the third request includes a different identifier of the different user;

generate additional metadata in response to validating the identifier associated with the user in the third request, wherein the additional metadata includes information about a transfer of the ownership from the user to the different user; and store the additional metadata on the blockchain.

12. The apparatus of claim 11, wherein the processor is further configured to:

receive a fourth request to modify the digital asset from the application executing the augmented reality effect, wherein the fourth request is from the different user;

generate secondary metadata in response to validating the different identifier associated with the different user, wherein the secondary metadata includes information about modified characteristics of the digital asset; and store the secondary metadata on the blockchain.

13. A non-transitory computer-readable medium having instructions stored thereon for decentralized procedural digital asset creation, Wherein the instructions are executable by a processor to:

receive a first request to create a digital asset from an application executing an augmented reality effect on a computing device, wherein the first request includes an identifier associated with a user of the application and a plurality of actions executed in an interaction with the augmented reality effect that produces a visual object of the digital asset, Wherein the digital asset is programmed to change one or both of a size and a color of the visual object based on a frequency of access of the application by the user;

generate the digital asset and metadata of the digital asset based on the plurality of actions, wherein the metadata includes information about characteristics of the visual Object of the digital asset and ownership of the digital asset by the user;

store the metadata without the digital asset on a blockchain;

receive a second request to access the digital asset from the application; and transmit, to the application for rendering, the metadata stored on the blockchain in response to validating the identifier associated with the user in the second request.

* * * * *